(12) United States Patent
Gopalan (10) Patent No.: US 8,935,506 B1
(45) Date of Patent: Jan. 13, 2015

(54) MEMX: VIRTUALIZATION OF CLUSTER-WIDE MEMORY

(75) Inventor: Kartik Gopalan, Vestal, NY (US)

(73) Assignee: The Research Foundation for The State University of New York, Binghamton, NY (US)

(*) Notice: Subject to any disclaimer, the term of this patent is extended or adjusted under 35 U.S.C. 154(b) by 194 days.

(21) Appl. No.: 13/427,110

(22) Filed: Mar. 22, 2012

Related U.S. Application Data (60) Provisional application No. 61/469,805, filed on Mar. 31, 2011.

(51) Int. Cl.
*G06F 12/00* (2006.01)

(52) U.S. Cl.
USPC .......................................................... 711/202

(58) Field of Classification Search
USPC .......................................................... 711/202
See application file for complete search history.

(56) References Cited

U.S. PATENT DOCUMENTS

2010/0077013 A1* 3/2010 Clements et al. ............. 707/822

OTHER PUBLICATIONS

Michael R Hines and Kartik Gopalan, "MemX: Supporting Large Memory Workloads in Xen Virtual Machines", Nov. 12, 2007, Virtualization Technology in Distributed Computing (VTDC).*

Umesh Deshpande, Beilan Wang, Shafee Hague, Michael Hines, Kartik Gopalan, "MemX: Virtualization of Cluster-wide memory", Sep. 13-16, 2010, 2010 39th International Conference on Parallel Processing (ICPP), pp. 663-672.*

* cited by examiner

*Primary Examiner* — Aimee Li
*Assistant Examiner* — Christopher Do
(74) *Attorney, Agent, or Firm* — Steven M. Hoffberg; ostronlenk Faber LLP (57) ABSTRACT

MemX provides a distributed system that virtualizes cluster-wide memory to support data-intensive and large memory workloads in virtual machines (VMs), and provides benefits in virtualized settings: (1) VM workloads that access large datasets can perform low-latency I/O over virtualized cluster-wide memory; (2) VMs can transparently execute very large memory applications that require more memory than physical DRAM present in the host machine; (3) reduces the effective memory usage of the cluster by de-duplicating pages that have identical content; (4) existing applications do not require any modifications to benefit from MemX such as the use of special APIs, libraries, recompilation, or relinking; and (5) supports live migration of large-footprint VMs by eliminating the need to migrate part of their memory footprint resident on other nodes. Detailed evaluations show that large dataset applications and multiple concurrent VMs achieve significant performance improvements using MemX compared against virtualized local and iSCSI disks.

27 Claims, 6 Drawing Sheets

Quicksort

MEMX: VIRTUALIZATION OF CLUSTER-WIDE MEMORY

CROSS REFERENCE TO RELATED APPLICATIONS

The present application claims benefit of priority under 35 U.S.C. §119(e) of Provisional Patent Application No. 61/469,805, filed Mar. 31, 2011, the entirety of which is expressly incorporated herein by reference.

GOVERNMENT RIGHTS CLAUSE

This invention was made with government support under CNS-0845832, CNS-0855204 awarded by the National Science Foundation. The government has certain rights in the invention.

BACKGROUND OF THE INVENTION

High-performance, cloud, and enterprise computing environments increasingly use virtualization to improve the utilization efficiency of their computing, storage, and network resources. Applications that execute within virtual machines (VMs) often tend to be data-intensive and latency-sensitive in nature. The I/O and memory requirements of such VMs can easily exceed the limited resources allocated to them by the virtualization layer. Common examples of resource-intensive VM workloads include large database processing, data mining, scientific applications, virtual private servers, and back-end support for websites. Often, I/O operations can become a bottleneck due to frequent access to massive disk-resident datasets, paging activity, flash crowds, or competing VMs on the same node. Even though demanding VM workloads are here to stay as integral parts of cluster-infrastructures, state-of-the-art virtualization technology is inadequately prepared to handle their requirements.

Data-intensive and large memory workloads can particularly suffer in virtualized environments due to multiple software layers of indirection before physical disk is accessed. To handle large memory workloads, developers often implement domain-specific out-of-core computation techniques [1] that juggle I/O and computation. But these techniques do not overcome one fundamental limitation—the VM's working set cannot exceed the memory within a single physical machine. Further, many recent large-scale web applications, such as social networks [2], online shopping, and search engines, exhibit little spatial locality, where servicing each user request requires access to disparate parts of massive datasets. To compound the problem further, each user query could be processed by multiple tiers of software, adding to the cumulative I/O latency at each tier. For instance, Amazon [3] processes hundreds of internal requests to produce a single HTML page. Simply buying specialized large-memory machines [4] is also not viable in the long-term because cost-per-gigabyte of DRAM tends to increase non-linearly, making these machines prohibitively expensive to both acquire and maintain. Thus low-latency, and possibly locality-independent, I/O to massive datasets is proving to be a critical requirement for new class of cluster-based applications.

Distributed shared memory (DSM) systems [17], [18] allow distributed parallel applications running on a set of independent nodes to share common data across a cluster. DSM systems often employ heavyweight consistency, coherence, and synchronization mechanisms and may require distributed applications to be written against customized APIs and libraries. In similar spirit, memcached [7] provides an API to access a large distributed in-memory key-value store. In non-virtualized settings, the use of memory from other machines to support large memory workloads has been explored [19], [20], [21], [22], [23], [8], [24]. However, these systems did not address the comprehensive design and performance considerations in using cluster-wide memory for virtual machine workloads. Additionally, early systems were not widely adopted, presumably due to smaller network bandwidths and higher latencies at that time. A recent position paper [25] also advocates the treatment of cluster memory as a massive low-latency storage, but with focus on developing new APIs for applications.

See, e.g., the following references, each of which is expressly incorporated herein by reference in their entirety: U.S. Pat. Nos. 8,131,814; 2008/0082696; 2009/0157995; U.S. Pat. Nos. 8,095,771; 8,046,425; 7,925,711; 7,917,599; 6,167,490; 6,298,419; 6,766,313; 6,886,080; 7,188,145; 7,320,035; 7,386,673; 7,536,462; 2002/0016840; 2005/0039180; 2006/0184673; 2006/0190243; 2007/0288530; 2009/0012932; 2009/0070337; 2009/0144388; 2009/0150511; 7,631,016; 7,617,218; 7,437,426; 6,640,285; 6,516,342; 4,240,143; 4,253,146; 4,843,541; 5,095,420; 5,159,667; 5,218,677; 5,237,668; 5,442,802; 5,592,625; 5,918,249; 6,026,474; 6,044,438; 6,148,377; 6,185,655; 8,127,225; 8,127,086; 8,122,348; 8,112,715; 8,108,768; 8,108,373; 8,103,125; 8,095,556; 8,090,688; 8,088,011; 8,082,400; 8,073,994; 8,069,317; 8,069,154; 8,046,557; 8,046,425; 8,037,038; 8,032,610; 8,027,960; 8,015,281; 8,010,896; 7,970,761; 7,958,440; 7,953,687; 7,937,447; 7,930,371; 7,925,711; 7,917,599; 7,849,164; 7,805,706; 7,783,932; 7,765,176; 7,761,737; 7,761,625; 7,761,624; 7,734,998; 7,734,890; 7,721,292; 7,702,875; 7,668,923; 7,610,523; 7,610,345; 7,430,639; 7,424,577; 7,369,912; 7,356,679; 7,321,992; 7,318,076; 7,260,831; 7,254,837; 7,249,208; 7,237,268; 7,194,589; 7,149,855; 7,149,730; 7,145,837; 7,133,941; 7,076,632; 7,051,158; 7,043,623; 6,999,956; 6,986,076; 6,985,912; 6,976,073; 6,901,512; 6,829,761; 6,829,637; 6,826,123; 6,772,218; 6,766,420; 6,694,511; 6,671,789; 6,640,245; 6,609,159; 6,604,123; 6,601,083; 6,594,671; 6,567,818; 6,560,609; 6,553,384; 6,519,601; 6,516,342; 6,505,210; 6,502,103; 6,477,527; 6,442,564; 6,430,640; 6,430,600; 6,418,447; 6,360,248; 6,356,932; 6,353,860; 6,343,312; 6,327,587; 6,321,266; 6,292,880; 6,226,637; 6,212,573; 6,185,655; 6,167,490; 6,163,801; 6,148,377; 6,138,140; 6,134,540; 6,122,627; 6,105,074; 6,081,833; 6,065,046; 6,009,266; 5,987,506; 5,987,496; 5,978,813; 5,961,606; 5,893,097; 5,765,036; and 5,729,710.

SUMMARY OF THE INVENTION

One aspect of the present technology provides a transparent and reliable distributed system that virtualizes cluster-wide memory for data-intensive and large memory VM workloads, called "MemX". MemX is designed, for example, to aggregate multiple terabytes of memory from different physical nodes into one or more virtualized memory pools that can be accessed over low-latency high-throughput interconnect (such as 1 Gbps, 10 GigE, or Infiniband). This virtualized memory pool is then made available to unmodified VMs for use as, for example, either (a) a low-latency in-memory block-device that can be used to store large-datasets, or (b) a swap device that reduces the execution times for memory-hungry workloads. MemX offers a number of benefits:

VM workloads that process large datasets can perform low-latency I/O over virtualized cluster-wide memory;

VMs can transparently execute very large memory applications that require more DRAM than physically present in the host machine;

Existing applications typically do not require any modifications such as the use of special APIs, libraries, recompilation, or relinking;

Reduces the effective memory usage of the cluster by de-duplicating pages having identical contents;

Works seamlessly with the live migration of data-intensive VMs by eliminating the need to migrate part of their memory footprint resident on other nodes.

Prior approaches to overcome the disk I/O bottleneck have examined the use of memory-resident databases [5], [6] and caching [7], [8] techniques. Gray and Putzolu [9] predicted in 1987 that "main memory will be begin to look like secondary storage to processors and their secondary caches". Recently Facebook announced [2] that it uses memcached [7]—a distributed in-memory key-value store—to cache results of frequent database queries.

A simple view of the role of MemX is that it aims to facilitate virtualizing cluster-wide memory as a massive low-latency storage device for large datasets. The commoditization of low-latency multi-gigabit network fabrics makes MemX practical, and future evolution of such networks will enhance performance further. Interconnects such as Gigabit, 10 GigE, and Infiniband offer high throughput (up to 40 Gbps) and low-latency (as low as 5 μs). Although the system evaluations reported in the present examples are over 1 Gbps Ethernet, MemX itself is agnostic to the networking technology and can scale as both network latency and bandwidth improve.

The current MemX tested hosts 1.25 Terabyte collective memory. The prototype is implemented in the Xen [10] environment, but the techniques are easily portable to other virtualization platforms.

MemX can operate in various modes, namely, (1) MemX-VM within individual VMs, (2) MemX-DD within a common driver domain shared by multiple VMs, and (3) MemX-VMM within the hypervisor, also called Virtual Machine Monitor (VMM), for supporting full virtualization of unmodified operating systems. Using several I/O intensive and large memory benchmarks, applications are shown to achieve significant performance speedups using MemX when compared against virtualized disks.

Basic Architecture of MemX

Figure 1:
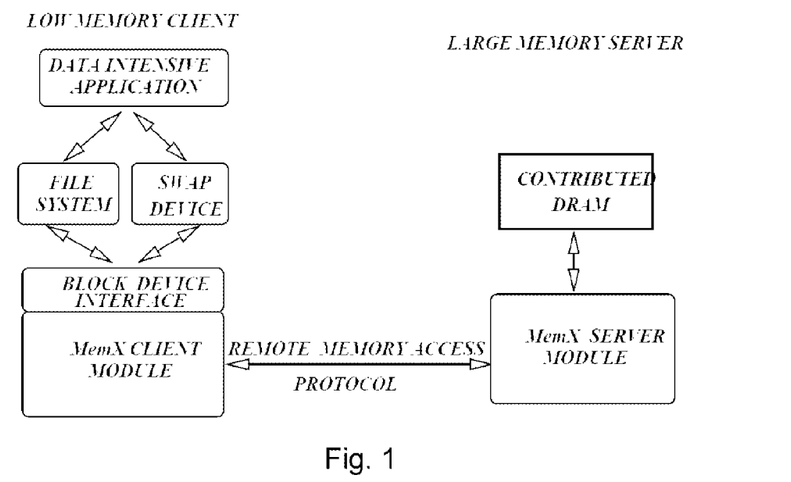
FIG. 1 shows a block diagram of the basic architecture of MemX.

FIG. 1 shows the basic architecture of MemX, which allows VMs in a cluster to pool their memory in a distributed fashion. Two main components of MemX are the client and the server modules. A feature of a preferred implementation, is that any VM in the cluster can switch into the role of either a client or a server, depending upon its memory usage. A VM that is low on memory can switch to client mode, whereas a VM (or physical machine) with excess (unused) memory can switch to server mode. Clients communicate with servers across the network using a MemX-specific protocol, called the remote memory access protocol (RMAP). Both client and server components execute as transparent kernel modules in all configurations.

[Client Module]

The client module provides a virtualized block device interface to the large dataset applications executing on the client VM. This block device can either be configured as, for example, (a) a low-latency volatile file-system for storing large datasets, or (b) a low-latency primary swap device, or (c) memory-mapped I/O space for large memory application. To the rest of the VM, the block device looks like a simple I/O partition with a linear I/O space that is no different from a regular disk partition, except that the access latency happens to be over an order of magnitude smaller than that observed in a rotating magnetic disk. Internally, however, the client module maps the single linear I/O space of the block device to the unused memory of one or multiple remote servers.

The client module according to the prototype embodiment also bypasses a standard request-queue mechanism used in Linux block device interface, which is normally used to group together spatially consecutive block I/Os on disk. This is because, unlike physical disks, the access latency to any offset within this block device is almost constant over a wired LAN, irrespective of the spatial locality. The client module also contains a small bounded-sized write buffer to quickly service write I/O requests.

The next section describes how the client module can be configured to operate in exclusive mode (within a VM) or in shared mode (within a driver domain) with different tradeoffs.

[Server Module]

A server module stores pages in memory, which can interface with selected clients or any client across the LAN. Servers typically broadcast periodic resource announcement messages which the client modules use to discover the available memory servers. Servers may include feedback about their memory availability and load within both resource announcement as well as regular page transfers to clients. When a server reaches capacity, it would normally decline to serve any new write requests from clients, which then try to select another server. Like the client module, server can also operate in either exclusive mode (within a VM) or in shared mode (in a driver domain). In both modes, pages hosted by one server can be migrated live to another server, without interrupting client execution.

[Remote Memory Access Protocol (RMAP)]

Client and server modules preferably communicate using a custom-designed layer 2 reliable datagram protocol, called RMAP. RMAP is a lightweight protocol that includes the following features: (1) reliable message-oriented communication, (2) flow-control, and (3) fragmentation and re-assembly. While clients and servers could technically communicate over TCP or UDP, this choice comes burdened with unwanted protocol processing overhead. For instance, MemX does not require TCP's features such as byte-stream abstraction, in-order delivery, or congestion control. Nor does it require IP routing functionality, since MemX is normally meant for use within a single subnet. The use of the more recent SCTP (Streaming Control Transmission Protocol) is a possible alternate, but RMAP was developed for a couple of reasons. First, SCTP requires the use of socket interface, which significantly delays the processing of received packets due to scheduling and context switching overheads. In contrast, RMAP registers a custom receive handler with the device driver and performs most receive processing in the kernel's interrupt context (or softirq) allowing for very low latency response times. Secondly, experiments showed that maximum throughput obtained with Linux kernel's current implementation of SCTP is around 300 Mbps, which was clearly inadequate. Thus RMAP completely bypasses the TCP/IP protocol stack and communicates directly with the network device driver. A fixed-size transmission window is maintained to control the transmission rate. Another consideration is that while the standard memory page size is 4 KB (or sometimes 8 KB), the maximum transmission unit (MTU) in traditional Ethernet networks is limited to 1500 bytes. Thus RMAP implements dynamic fragmentation/re-assembly for page transfer traffic. Additionally, RMAP also has the flexibility to use jumbo frames, which are packets with sizes greater than 1500 bytes (typically between 8 KB and 16 KB), that enable transmission of complete 4 KB pages using a single packet.

MemX is the first cluster-wide memory virtualization system for I/O intensive and large memory virtual machines that is reliable, exploits page-sharing, works with live VM migration, and is designed to scale to multi-terabyte memory capacity.

MemX allows existing applications to scale to cluster-wide memory without the need for special APIs. One can also migrate processes [26] or entire VMs [11] from a low-memory node to a memory-rich node. However applications within each VM are still constrained to execute within the memory limits of a single physical machine at any time. In fact, MemX can be used in conjunction with live VM migration, combining the benefits of both live migration and remote memory access. Page-sharing has been employed previously in the context of virtual machines for over-subscribing memory within a single physical machine [27], [28]. The idea is to locate memory pages from different co-located VMs that have the same content and share such pages. This allows more VMs to be consolidated within a single physical machine. Memory Buddies [29] takes this notion one step further by migrating VMs to other physical machines where sharing is maximized. The local page-sharing approach in MemX is orthogonal to the above two approaches and can presumably be used in conjunction with them. On the other hand, the global sharing approach in MemX can be considered as a converse of the Memory Buddies approach in that it migrates individual pages, rather than entire VMs, to those physical machines where page sharing is maximized.

The notion of virtual disk containers over a pool of physical disks was proposed in [30] that could tolerate disk, server, and network failures. In the domain on remote memory, the RMP system [22] also proposed a RAID-like mechanism for reliability in a non-virtualized remote-memory paging system. While similar in spirit, the design of reliability in MemX differs by using the notion of page-groups which is critical for scaling to terabyte memory. Striping and parity computation in MemX are performed within the granularity of page-groups, rather than the entire cluster-wide memory, which reduces memory pressure at the client VMs and speeds up recovery from server failures.

The present technology provides a system and method in which client systems offload memory storage and access demands onto networked computers, to provide for example fast access, and fault tolerance, with high speed. De-duplication may also be supported. A distributed virtual memory system is typically provided with a block device interface for processes executing on a client system, providing an interface to a virtual distributed memory system having a linear I/O space. The linear I/O space of the block device interface is mapped to a memory system of at least one remote server. In order to provide fault tolerance, parity information is generated at the originating system (or elsewhere) and to sent to a different server than that which stores the memory pages, thus permitting recovery in the event that one or more servers becomes unavailable after receiving a memory page. Typical parity schemes may be implemented.

As part of the block device interface system, blocks of memory may be provided as page groups, for which parity information is generated, and which may provide inferential and/or indexed storage locations, and thus facilitate mapping of memory pages. A page group comprises a series of memory pages which are logically organized as rows and columns, for example with additional parity columns. The page group provides an organizational structure which facilitates compact addressing, for example by an algorithm which defines for each memory page stored through the block device interface, a particular location on a particular server. Thus, a full absolute expression of the page location need not be employed for lookups, thus permitting single word operations to speed access. The number of remote servers may be different than the number of columns, but pages from the same row are preferably not be stored on a common server, in order to avoid highly correlated double faults. However, the number of memory servers may be larger than the number of columns plus parity columns, and thus the load may be distributed over an arbitrarily large number of memory servers. Typically, for a single page group, the same number of servers is used as data plus parity columns, and if other servers are available, these can be used to service different page groups. One advantage of this arrangement is that the remote memory servers, which emulate a block device, can predictively queue or fetch subsequent memory pages, even before requested, or even push predicted pages to the client without an express request, thus reducing latencies and providing a high throughput. In some cases, the predictive push may be inferred, and therefore the client system may initiate a stream of memory pages from a page group, without explicit request, and the client system may then interrupt the transfer when and if the memory pages are not required.

By allocating different sets of servers to different page groups, operations involving the different page groups may be performed in parallel, and not competing for the same remote server resources. As discussed above, the page group representation provides reduced mapping overhead, thus reducing the computational complexity for a remote memory lookup on the memory client. Multiple memory clients may use the resources of common servers, and in some cases, a memory client may also acts as a remote server for other memory clients, especially when the memory client has non-uniform task loads over time.

In one embodiment, a memory client implements local deduplication of memory pages. For example, a hash value is computer for each memory page. As a page is being processed for transfer to a remote server, it is tested to determine whether the page is a duplicate of a preexisting page determined based on an identity of the hash. When a duplicate is identified, a page table is populated with an alias. When that page is then sought from the remote server, the page table is consulted, and the appropriate alias page recalled. In some cases, the aliased page will be stored locally on the client system, in which case it is duplicated when it is called. If the referenced page or aliased page is modified, the page is first dealiased (duplicated) and the changes then implemented.

Deduplication can also be implemented at a respective remote server, such that the storage of the remote server may be made more efficient. Note that if a single remote server services multiple client systems, the deduplication may occur across different client's memory pages.

A distributed or global deduplication may be implemented by providing communications of hash tables or other coordinated action. In some cases, deduplication may be blocked, and certain duplication permitted to persist. For example, in some cases, an uninterrupted sequence of pages may be handled more efficiently than a random sequence of aliases which are stored in different places or according to different addressing schemes.

The present system and method ensure reliability, since the parity scheme provides fault tolerance, while the system is highly scalable based on use of additional memory servers.

The present system and method provides three virtual machine embodiments, relevant in various environments supporting virtual machines. In a first embodiment, a respective virtual machine may implement its own memory management module, which acts as an internal block device interface, and which communicates outside the virtual machine as a network interface. In a second embodiment, a memory management system is provided in an operating system or hypervisor layer, in which a plurality of virtual machines treat the memory management system as a block device interface service, which then supports physical device communications. In a third embodiment, the memory management system provides a large virtual memory space to each virtual machine, and avoids a block device interface altogether at the virtual machine level.

These may differ somewhat in implementation, but share common features. One difference is that, within a respective virtual machine deduplication is not possible with respect to other virtual machines unless a distributed deduplication facility is provided, while a common memory management module for a plurality of virtual machines can manage deduplication for all hosted virtual machines together. The second and third embodiments are distinct with respect to the logical nature of the interface; in the second embodiment, the memory management system appears as a block device interface, while in the third embodiment the memory management system appears as a large memory space subject to virtualization.

According to a further embodiment, a block device interface may be provided which emulates a physical block device. For example, a memory appliance may be provided, for example, with a Serial Advanced Technology Attachment (SATA) interface or Serial Attached SCSI (SAS) interface, but which logically implements the memory virtualization. The memory appliance may have, for example, its own network interface (such as 1G or 10G Ethernet).

The present technology also provides a server module for a distributed virtual memory system, comprising a resource discovery transmission module, configured to periodically sent resource announcement messages through a computer network, providing an indication of available local memory to the server module and load; a page serving module, configured to retrieve a page from local memory, append to the page an indication of available local memory to the server module and load, and transfer the appended page through the computer network; and a page migration module, configured to migrate a page of memory to another server module across the computer network, and to send a message to a respective client to provide an update of a location of the migrated page.

The present technology further provides a server module for a distributed virtual memory system, comprising a resource discovery transmission module, configured to periodically sent resource announcement messages through a computer network, providing an indication of available local memory to the server module and load; a page serving module, configured to retrieve a page from local memory, append to the page an indication of available local memory to the server module and load, and transfer the appended page through the computer network; a page migration module, configured to migrate a page of memory to another server module across the computer network, and to send a message to a respective client to provide an update of a location of the migrated page.

In the case of deduplication, the memory page alias is stored as metadata on the aliased memory page, and thus is represented as part of parity. If either an alias or an aliased page is updated, the metadata entry for the aliased page is then invalid, and therefore the aliased page must be updated. However, in order to update the parity information, all of the pages from the same row should also be recalled, so that the new parity information can be generated and then stored. One way to overcome this potentially inefficient result is to store a delta map in association with the hash table (e.g., locally stored), which serves as an overlay to modify a retrieved page based on the changes made. This technique may be useful especially when the client system is under high load, and permits deferred updating of the memory pages when the load is reduced.

Another feature of the present technology is that it supports virtual server migration. In this case, the server may be replicated completely, before a transition of responsibilities (pre-copy), or a new virtual server instantiated, which then has the required applications initiated (post-copy). In each case, the memory management system may handle the change in servers by mapping the old to new memory page transition while ensuring that the migration does not interrupt in-process tasks. See, e.g., Michael R. Hines and Kartik Gopalan, "Post-Copy Based Live Virtual Machine Migration Using Adaptive Pre-Paging and Dynamic Self-Ballooning", VEE '09, Mar. 11-13, 2009, Washington, D.C., USA, Michael R. Hines, Umesh Deshpande, and Kartik Gopalan, "Post-Copy Live Migration of Virtual Machines", SIGOPS Operating Systems Review, July 2009, Michael Hines, "Techniques for Collective Physical Memory Ubiquity Within Networked Clusters of Virtual Machines", Doctoral Dissertation, 2009, Binghamton University, Operating Systems and Networks Laboratory, each of which is expressly incorporated herein by reference.

Corresponding methods of remotely serving memory pages are also provided.

DETAILED DESCRIPTION OF THE PREFERRED EMBODIMENTS

Various configurations in which MemX can operate are described, and their relative merits compared.

A. MemX-VM: MemX Client Module in VM

Figure 2:
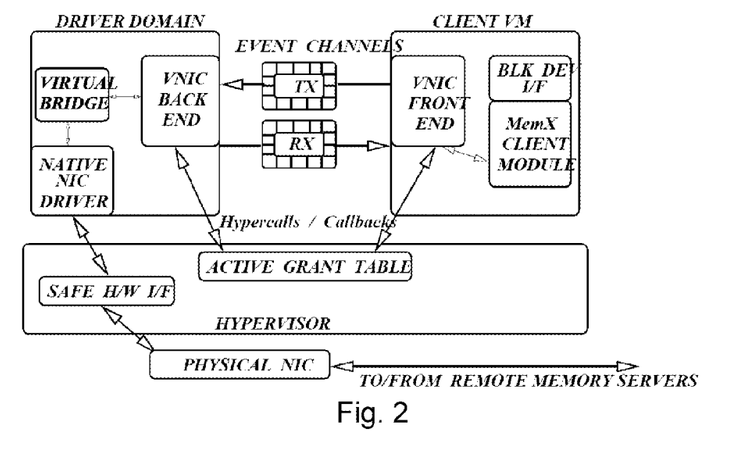
FIG. 2 provides a block diagram of the MemX-VM mode: MemX client operates within the client VM.

In order to support memory intensive large dataset applications within a VM environment, the first design option is to place the MemX client module within the guest OS in the VM. This option is shown in FIG. 2. On one side, the client module exposes a block device interface for large memory applications within the VM. On the other side, the MemX client module communicates with remote MemX servers via a virtualized network interface (VNIC). VNIC is an interface exported by a special VM called the driver domain which has the privileges to directly access all I/O devices in the system. (Driver domain is usually synonymous with Domain 0 in Xen).

The VNIC interface is organized as a split device driver consisting of a frontend and a backend. The frontend resides in the VM and the backend in the driver domain. Frontend and backend communicate with each other via a lockless producer-consumer ring buffer to exchange grant references to their memory pages. The grant reference is essentially a token that one VM gives to another co-located VM granting it the permission to access/transfer a memory page. A VM can request the hypervisor to create a grant reference for any page of its memory. The primary use of the grant references in device I/O is to provide a secure communication mechanism between an unprivileged VM and the driver domain so that the former can receive indirect access to hardware devices, such as network cards and disk. The driver domain can set up a DMA-based data transfer directly to/from the system memory of a VM rather than performing the DMA to/from driver domain's memory with the additional copying of the data between VM and driver domain. The grant table can be used to either share or transfer pages between a VM and driver domain depending upon whether the I/O operation is synchronous or asynchronous in nature.

Two ring buffers are used between the backend and frontend of the VNIC—one for packet transmissions and one for packet receptions. To perform zero-copy data transfers across the domain boundaries, the VNIC performs a page transfer with the backend for every packet received or transmitted. All VNIC backends in the driver domain can communicate with the physical NIC as well as with each other via a virtual network bridge. Each VM's VNIC is assigned its own MAC address whereas the driver domain's VNIC uses the physical NIC's MAC address. The physical NIC itself is placed in promiscuous mode by the driver domain to enable the reception of any packet addressed to any of the local VMs. The virtual bridge demultiplexes incoming packets to the target VM's backend driver.

Some of the sources of overhead in the MemX-VM architecture are as follows. Due to the nature of the split-driver VNIC architecture, MemX-VM configuration requires every network packet to traverse across the domain boundary between the VM and the driver domain. In addition network packets must be multiplexed or demultiplexed at the virtual network bridge. Additionally, the client module has to be separately loaded in each VM that might potentially execute large memory applications. Finally, each I/O request is typically 4 KB (or sometimes 8 KB) in size, whereas most typical Ethernet hardware uses a 1500-byte MTU (maximum transmission unit), unless the underlying network supports jumbo frames. Thus the client module must fragment each 4 KB write request into (and reassemble a complete read reply from) at least 3 network packets. Each fragment needs to cross the domain boundary to reach the backend. Depending upon the memory management mechanism in the VM, each fragment may consume an entire 4 KB page worth of memory allocation, i.e., three times the typical page size. This performance overhead is contrasted in greater detail with MemX-DD option below.

B. MemX-DD: MemX Client Module in Driver Domain

Figure 3:
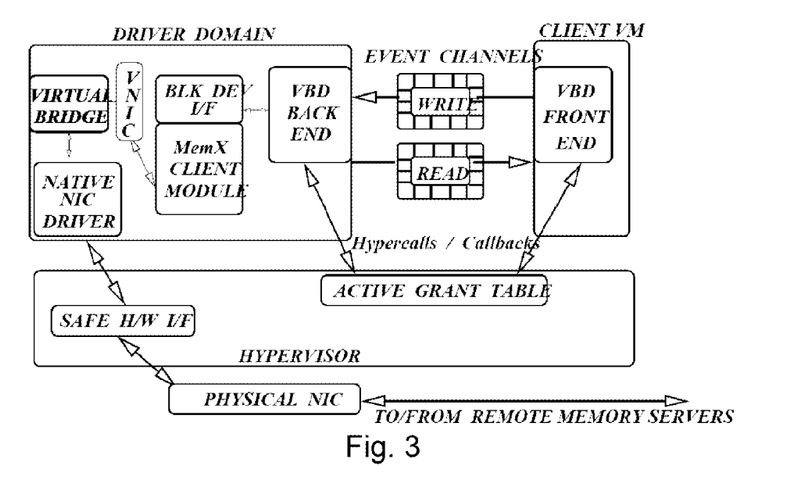
FIG. 3 provides a block diagram of MemX-DD: A shared MemX client within a privileged driver domain multiplexes I/O requests from multiple guests.

A second design option, shown in FIG. 3, is to place the MemX client module within the driver domain (Domain 0). Each VM can then be assigned a split virtual block device (VBD) interface, with no MemX specific configuration or changes required in the guest OS. The frontend of the split VBD resides in guest and the backend in the driver domain. The frontend and backend of each VBD communicate using a producer-consumer ring buffer.

On one side, the MemX client module in driver domain exposes a block device interface to rest of the driver domain. On the other side, the MemX client module communicates with the physical network card. The back-end of each split VBD is configured to communicate with the MemX client through a separate block device (/dev/memx{a,b,c}, etc). Any VM can configure its split VBD as either swap device for transparent cluster-wide paging, or a file system for low-latency storage. Synchronous I/O requests, in the form of block read and write operations, are conveyed by the split VBD interface to the MemX client module in the driver domain. The client module packages each I/O request into network packets and transmits them asynchronously to remote memory servers using RMAP.

Note that, unlike in MemX-VM, network packets no longer need to pass through a split VNIC architecture (although packets still need to traverse software bridge in the driver domain). Consequently, while client module may still need to fragment a 4 KB I/O request into multiple network packets to fit the MTU requirements, each fragment no longer needs to occupy an entire 4 KB buffer. As a result, only one 4 KB I/O request needs to cross the domain boundary across the split VBD driver, as opposed to three 4 KB packet buffers in MemX-VM. Further, the MemX client module can be inserted once in the driver domain and be shared among multiple guests.

In order to support seamless migration of live VMs under MemX-DD, the part of the VM's internal state (page-to-server mappings) that resides in the driver domain of MemX-DD should be transferred by the migration mechanism, a feature not supported in Xen.

C. MemX-VMM: Expanding Guest-Physical Address Space

Figure 4:
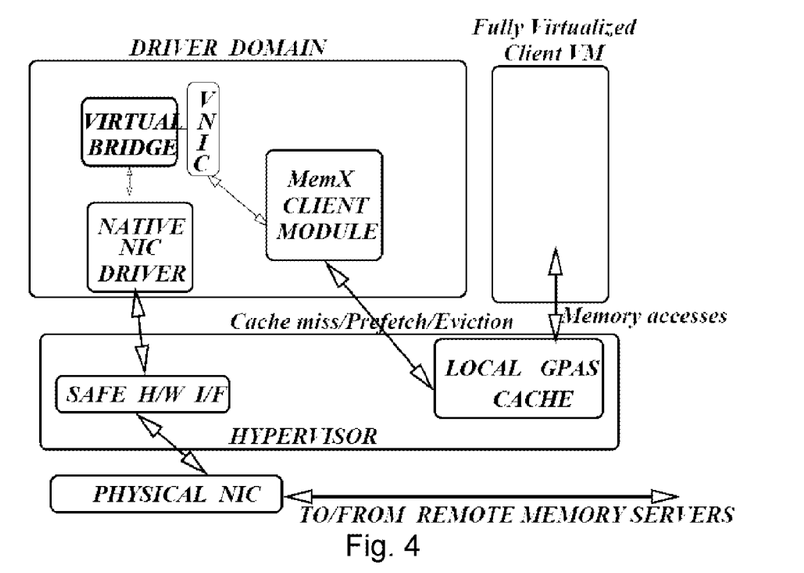
FIG. 4 shows a block diagram of MemX-VMM, which supports GPAS larger than local DRAM for fully virtualized VMs.

The previous two options assume that the VM is running a para-virtualized operating system that performs its I/O operations through a split-driver interface (either VNIC or VBD). This section describes an additional option—MemX-VMM—that allows MemX to support unmodified operating systems in VMs, i.e., those executing in full-virtualization mode. When a VM boots up, the virtual machine monitor (VMM or hypervisor) presents the VM with a logical view of physical memory called the guest-physical address space (GPAS). Traditional virtualization architectures, such as Xen and VMWare, do not permit the GPAS size to exceed the actual DRAM in the physical machine. MemX-VMM, on the other hand, presents the VM with a larger GPAS than the actual DRAM in the local machine, making the guest OS believe that it has a large amount of memory at boot time. Of course, not all GPAS memory can reside on the local machine. Thus an actively used subset (the working set) of the GPAS is stored locally whereas rest of the GPAS is stored in cluster-wide memory. It then becomes the VMM's task to perform this mapping of GPAS partly into the local memory and partly into the cluster-wide memory.

In order to provide the illusion of a larger GPAS, MemX-VMM utilizes a shadow-paging mechanism, which works as follows. The VMM marks the memory containing the VM's page-tables as read-only. Thus any write accesses by a VM to page-table memory is intercepted by the VMM. The VMM maintains another table mapping the guest-physical page frame numbers (GFN) in GPAS to machine-physical page frame numbers (MFN)—also called the G2M table. Depending on whether a page resides in local memory or in the network, MemX-VMM marks the corresponding entry in the G2M table as being locally resident or not.

The VMM combines the two tables—VM's page tables and the G2M table—and dynamically constructs shadow page tables that map the virtual page frame numbers accessed by the VM to the corresponding MFNs. During the VM's execution, MemX-VMM transparently intercepts all page-faults generated by the VM. If the page-fault is for a page that resides in cluster-wide memory, it is called a network page fault. To service a network page fault, the VMM communicates with a MemX client module that resides in the driver domain. MemX client fetches the page from cluster-wide memory (as in the case of MemX-DD) and returns it to the VMM, which then maps the received page to the VM's address space, marks it as locally resident in the G2M table, and updates the shadow page table with the new mapping. Along with servicing the network page fault, the MemX client module also prefetches a window of pages around the location of the fault in anticipation of their being accessed by the VM in the near future. Thus MemX-VMM treats the subset of GPAS pages in local memory as a local cache for each VM. MemX-VMM also periodically evicts infrequently used pages from local memory to cluster-wide memory using a least recently used (LRU) eviction policy.

A basic MemX-VMM prototype was implemented in the Xen that can execute unmodified Linux VMs with cluster-wide GPAS in full-virtualization mode. Further optimizations are possible to improve the performance and stability of the implementation due to issues arising from Xen-specific implementation of the shadow-paging mechanism described above. Additionally, execution of unmodified Microsoft Windows® operating system may be supported.

D. MeniX Server in a VM

Another execution mode, orthogonal to the above three, is to execute the MemX server module itself within a VM. This option provides a significant functional benefit by enabling the server VM to migrate live from one physical machine to another with minimal interruption to client operations. The MemX server VM may be migrated live for any number of reasons, including load balancing the cluster-wide memory usage, or before a physical machine is shut down for maintenance. However this option does introduce additional overheads in network communication compared to a MemX server executing in a non-virtualized setting.

Key Features and Optimizations

A. Scalability

One of the key goals of the MemX system is to provide memory-constrained VMs with access to multi-terabyte cluster-wide memory. However, there is a fundamental challenge in scaling the system to terabyte levels: the MemX client needs to track where in the cluster each page of memory is located. Each page is identified by the pair of (server ID, offset), where server ID is the server holding the page and offset is the logical index of the page in the MemX block device presented by the client module (/dev/memx from earlier discussion). Suppose that MemX client VM uses a simple in-memory hash table to store the location of each of its pages in the cluster, that each page is 4 KB in size, and that it takes 6 bytes to store each identifier pair. To track 1 terabyte of cluster-wide memory, the minimum amount of kernel memory required just to store the hash table in the client VM is 1.6 GB; for 10 terabytes it is 16 GB and so on. Clearly, the memory pressure on client can become substantial as MemX scales up.

Figure 5:
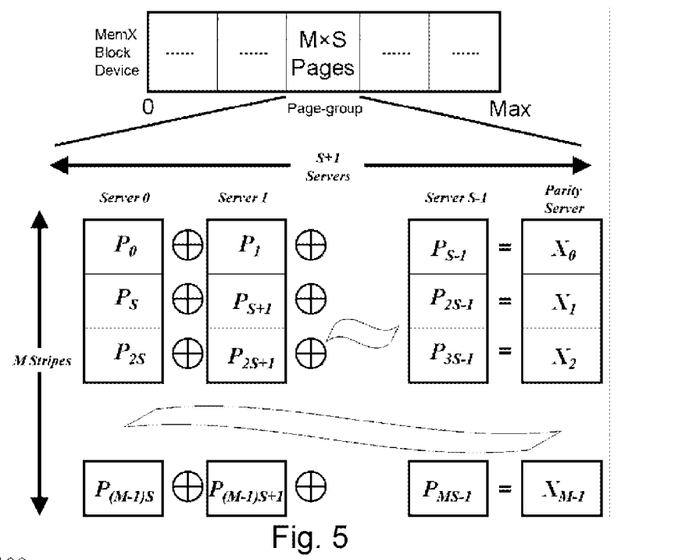
FIG. 5 shows a logical representation of a page-group of M×S pages, which is spread over S+1 servers and M stripes. The S+1$^{th}$ server stores parity information for each stripe.

To alleviate this memory pressure in tracking the page locations, the notion of a page-group is considered. A page-group, shown in FIG. 5, is a group of M×S consecutive pages in the MemX block device used by the client VM. The individual pages of the page-group are striped across S MemX servers in M logical stripes (rows in the figure). An additional server holds the computed parity for each stripe for fault-tolerance (discussed below in Section 1V-B). Now, instead of tracking the location of every page in the cluster, the MemX client tracks only the beginning offset of each page-group and the set of S+1 servers holding the pages and parity of the page-group. When the $K^{th}$ page in the page-group is accessed by the VM, the MemX client module simply requests the page from server number K%S for the page-group. This simple optimization reduces the memory required to track cluster-wide pages by a factor of M×S.

To illustrate with an example, if M=256 and S=4 then each page-group is of size M×S=1024 pages. The page at block offset 2155 in the block device belongs to page-group number 3 (2155/1024) and is the $107^{th}$ page (2155%1024) within the page-group. If servers S0, S1, S2, S3, and S4 hold the data and parity pages of the page-group then page 2155 resides in server S3 (since 107%4=3).

Note that the MemX block device consists of multiple page-groups and each page-group can be mapped to a different set of S+1 servers for load balancing. For instance, page-group 1 could be mapped to server set {S1, S2, S3, S4, S5}, page-group 2 mapped to a different server set {S6, S7, S8, S9, S10}, page-group 3 mapped to yet another server set {S2, S4, S6, S8, S10}, and so on. When a page-group is created, the client module selects the servers responsible for the page-group based on their available capacity.

B. Fault-Tolerance

Being a distributed system, MemX is designed to operate correctly in the presence of various types of faults, including packet loss, server failure, and client failure. Loss of packets (both MemX data and control) is handled through a reliable Remote Memory Access Protocol (RMAP) described earlier in the Section II. Here, the handling of a failure of any server or client is described.

[Soft-State Refresh]

MemX clients and servers track each others' liveness through two soft-state refresh mechanisms—regular packet exchanges and periodic heartbeat messages. First, if three consecutive RMAP packet transmissions from a server to a client VM fail, then the server module marks the client VM as unreachable. If the client remains unreachable after a fixed amount of time, then any client-specific state, which includes unshared memory pages and data structures, is purged. Similarly, if three successive packet transmissions are lost from a client VM to a server that holds its pages, then the client VM initiates steps to recover the data lost from a server failure (described below). MemX servers also periodically announce their availability in the network through low-frequency broadcast messages. During quiet periods, when there is no data exchange, the absence of three successive announcement messages leads the client VMs to initiate steps to recover from server failure.

[RAID-Like Recovery from Server Failure]

It is particularly important for client VMs that they recover any lost data in the event that any server holding its pages dies. MemX client VMs employ a RAID-like recovery mechanism to tolerate single-server failures. Each page-group (described earlier in Section IV-A and FIG. 5) is mapped by the client VM over (S+1) servers, where S servers hold data pages and one server holds parity pages. A page stripe is defined as the set of pages Pi such that i/S is the same (using integer division). For example, if S=4 then pages P0, P1, P2, P3 belong to the same stripe. Similarly, P4 through P7 are in the same stripe, and so on. Obviously, pages in same stripe reside in different servers. The parity block Xk for the $k^{th}$ stripe resides in the $(S+1)^{th}$ server. Upon failure of the $i^{th}$ server in a page-group, the client VM recovers the lost data pages for every stripe by performing a bitwise XOR over the remaining pages in other S servers. The recovered pages are then stored in a new server that does not already hold any data or parity pages of the page-group (assuming there are more than S MemX servers in the network and there is sufficient free space). During the recovery phase, read/write operations cannot be performed on any page-group that is affected by the failed server. Optionally, the affected I/O operations can be temporarily stored in the client VM till the recovery completes, although at the expense of transient memory pressure on the client.

Note that, unlike traditional disk-based RAID systems, all MemX servers do not need to have the same memory capacity, since the client VM has the flexibility of mapping different page-groups (and their parity) to different sets of S+1 servers. This flexibility also allows the parity data to be distributed over multiple MemX servers (at the granularity of page-group) and prevents any single server from becoming a bottleneck for parity I/O. Also, though handling failure of more than one server at a time is more complex, technically it can be accomplished by extending the above scheme using principles from RAID-6 and higher.

C. De-Duplication

De-duplication refers to eliminating redundancy by storing only one copy of pages that have identical content. There are two approaches to de-duplication.

[Local De-Duplication]

In this mode, each MemX server performs de-duplication across its local pages. When a MemX server receives a new page of data from a client VM, it computes a 64-bit hash key over the page contents (essentially a simple XOR over successive 64-bit words). This hash key is used to search a hash table stored at the server. Each entry in the hash table consists of a 64-bit hash key computed from page contents, and the corresponding page frame number as hash value. Given the hash key, if an entry is found, it means that a page corresponding to the key already exists at the server with possibly the same contents as the incoming page. MemX server then proceeds with a bitwise memory comparison of the contents of these two pages. If they match, a reference to the existing page is stored and the incoming page is discarded. A share-count associated with each page indicates the extent of sharing for each page stored in the MemX server. If no matching entry is returned or if the incoming page's contents are not identical to any existing page, then the incoming write is committed to a freshly allocated page and a new hash key is inserted into the hash table. If a MemX server receives a write request to a page which is presently being shared, then the share-count is decremented, a new memory page is allocated to store the incoming write, and its hash key is computed and stored. The entire sharing is completely transparent to the client VM.

[Global De-Duplication]

An alternative to the local de-duplication described above is to search for a matching page over all the pages stored cluster-wide. This can potentially lead to even greater reduction in memory usage. One way to implement global sharing could be in a client-driven fashion. Before selecting a server to host a new page, a MemX client VM could potentially query all servers for matching hash keys and send the new page to those servers having matching keys one at a time until a server with an exact match is found. One could reduce the overhead of having to send the page to multiple MemX servers by computing multiple hash keys for each page (using different hash functions), and selecting the server at which all hash keys match. Another approach for implementation is that the client could pick one MemX server and offload the key search and page matching overhead to that server, which might potentially be less loaded than the client VM itself. However, neither of the above two implementation options for global sharing is compatible with the notion of page-groups (described in Section IV-A).

D. Live GM and Page Migration

Most virtualization technologies, such as Xen, VMWare and KVM, support the ability of VMs to migrate live from one physical machine to another with minimal downtime, even as the VM workloads continue to execute [11]. Both MemX server and client VMs allow low memory VMs to continue using the cluster-wide memory even as the respective VMs are live migrating within the network. Migrating a VM in MemX-VM mode has the additional benefit that only the memory state within the client VM needs to be migrated. Any memory pages stored by the client on other MemX servers do not need to move; they remain accessible by the client VM even from its new physical host. One could also migrate a VM hosting a MemX server for various reasons, such as to perform load balancing between physical machines, or before shutting down the physical machine hosting the server VM for maintenance. Additionally MemX server includes the ability to migrate all the client pages it is hosting to another MemX server in the network. This could be done at the administrator's discretion, such as before the MemX server is shut down.

Performance Evaluation

The performance of the different variants of MemX are evaluated. The testbed consists of 32 nodes. Of these, 15 have each 70 GB memory and dual quad-core Intel Xeon E5520 2.25 Ghz CPUs, whereas the rest have each 16 GB memory and dual quad-core AMD Opteron 2376 CPUs. The network interfaces consist of a mix of onboard nVidia nForce Gigabit Ethernet, onboard Broadcom Gigabit Ethernet, and Intel 82546 GB Dual Port Gigabit Ethernet cards. Nodes acting as MemX servers can collectively provide a maximum of 0.25 TB of effectively usable cluster-wide memory. The experiments use Xen 3.3.1 and Linux 2.6.18.8. A range of tested memory sizes for the client VMs is from 512 MB to 8 GB. The client module is implemented in about 2600 lines of C code and server module in about 1600 lines, with no changes to the core Linux kernel. Virtualized disk in any experiment refers to a virtual block device (VBD) exported to the VM from the driver domain.

A. I/O Latency Comparison with Virtual Disk

MemX-DD and MemX-VM are compared against virtual disk in terms of I/O latency by measuring the round trip time (RTT) for a single 4 KB read request from a MemX client to a server. RTT is measured in kernel using the on-chip time stamp counter (TSC). This is the latency that the I/O requests from the virtual file system or the swap daemon would experience. MemX-DD provides an RTT of 95 µs, followed closely behind by MemX-VM with 115 µs. The virtualized disk base case performs as expected at an average 5.3 ms. These performance figures show that accessing the memory of remote machine over the network is about two orders of magnitude faster than from local virtualized disk. The split network driver architecture introduces an overhead of another 20 µs in MemX-VM over MemX-DD.

Figure 6:
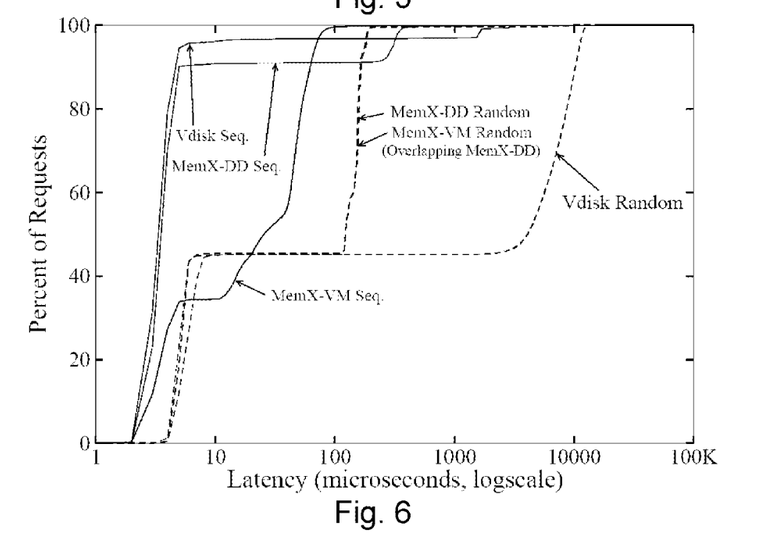
FIG. 6 shows a graph of sequential/random read latency distributions.

FIG. 6 compares the read latency distribution for a user level application that performs either sequential or random I/O on either MemX or the virtual disk. Random read latencies are an order of magnitude smaller with MemX (around 160 µs) than with disk (around 9 ms). Almost overlapping curves are observed with MemX-DD and MemX-VM configurations for random reads, due to very negligible difference between their remote memory access latencies. Sequential read latency distributions are similar for MemX-DD and disk primarily due to filesystem prefetching. Sequential read latency distribution for MemX-VM is higher by a maximum of few tens of microseconds. RTT distributions for buffered write requests (not shown) are similar for MemX and disk, mostly less than 10 µs due to write buffering. Note that these RTTs are measured from the user level, which adds a few tens of microseconds to the kernel-level RTTs. Smaller latencies are expected in a cluster with 10 GigE or Infiniband.

B. Bonnie+− Disk I/O Benchmarks

Figure 7:
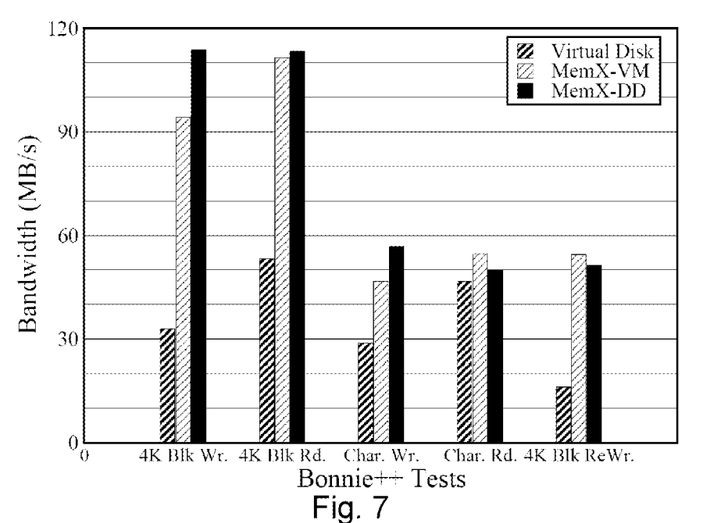
FIG. 7 shows a graph of Bonnie++ Bandwidth Test results.

The bandwidth of virtual disk is compared with MemX-VM and MemX-DD using Bonnie++ [12] benchmark suite. For this experiment, five MemX servers were used, collectively providing 70 GB of memory. Bonnie++ experiments are run in a VM which has 2 GB of memory and two virtual CPUs (VCPUs). FIG. 7 shows the comparison of MemX with virtual disk for 40 GB block and character I/O experiments. In the block experiment, block read/write operations are carried out with 4K chunk size, for which MemX-DD achieves close to the peak network bandwidth of 1 Gbps. Character write experiment, which writes to the disk byte by byte, performs worse than block write as it involves large number of system calls. In spite of system call overhead, MemX-DD does twice as well as virtual disk for character write experiments. Virtual disk almost matches the performance of MemX for character read, because reading a character doesn't result in disk I/O once the page is cached. Rewrite experiment of Bonnie++ reads the data of specified chunk size, modifies it and writes it back to the disk. Here virtual disk performance deteriorates further, as rewrite involves twice as many number of disk I/Os as normal reads or writes.

C. Application Speedups

Figure 8:
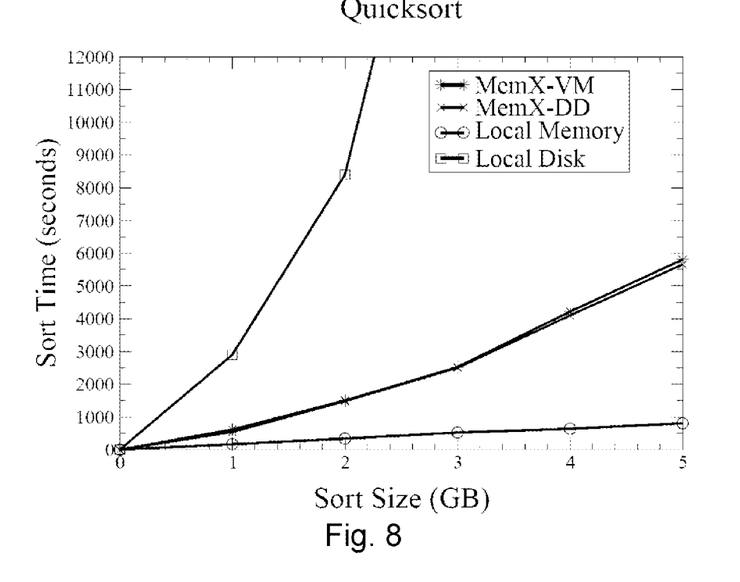
FIG. 8 shows a graph of Quicksort execution times vs. problem size.

The execution times of a few large memory applications are compared using MemX versus virtualized disk. FIG. 8 shows the performance of a Quicksort application that sorts increasingly large arrays of integers. A base case plot is included for pure in-memory sorting using a vanilla-Linux node. From FIG. 8, the disk case beyond 2 GB problem sizes was avoided, due to the unreasonably large amount of time it takes to complete.

The sortings using MemX-DD and MemX-VM however finished within 100 minutes for 5 GB problem size, the distinction between the two modes being very small. Also note that the performance is still about 3 times faster when using local memory, than with MemX, and consequently there is room for improvement with the use of faster, lower-latency interconnect. Table I lists the execution times for different applications and problem sizes including (1) Sysbench[13] online transaction processing benchmark, (2) Quicksort on a 15 GB and 5 GB dataset, (3) ray-tracing based graphics rendering application called POV-ray [14], and (4) TPC-H decision support benchmark[15]. Again, MemX outperforms virtual disk for each of these benchmarks.

TABLE 1

COMPARISON FOR DIFFERENT APPLICATION WORKLOADS

| Application | Mem Size | Client Mem | MemX-VM | MemX-DD | Virtual Disk |
|---|---|---|---|---|---|
| Sysbench | 800 GB | 4 GB | 400.08 trans/sec | 403.42 trans/sec | 229.91 trans/sec |
| Quicksort | 5 GB | 512 MB | 96 min | 93 min | >10 hrs |
| Quick sort | 15 GB | 2 GB | 189 min | 181 min | >10 hrs |
| Povray | 6 GB | 1 GB | 19 min | 20 min | >3 hrs |
| Povray | 13 GB | 2 GB | 42 min | 50 min | >6 hrs |
| TPC-H | 3 GB | 2 GB | 195.64 AphH@size | 226.14 AphH@size | 162.09 AphH@size |

D. MemX vs. iSCSI for Multiple Client VMs

Figure 9:
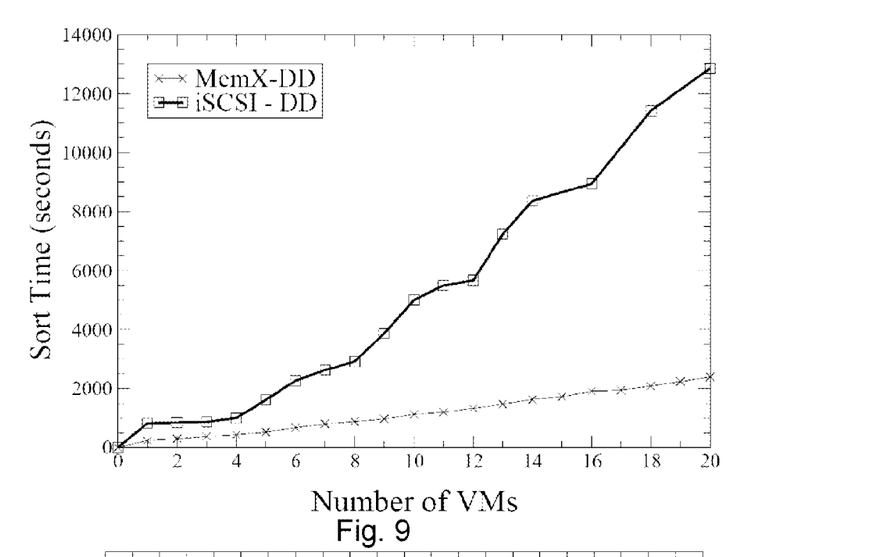
FIG. 9 shows a graph of Quicksort execution times for multiple concurrent guest VMs.

The overhead of executing multiple client VMs using MemX-DD versus iSCSI was evaluated. In most enterprise clusters, a high-speed backend interconnect, such as iSCSI or FibreChannel, would provide backend storage for guest VMs. To emulate this case, five dual-core 4 GB memory machines were used to evaluate MemX-DD in a 4-disk parallel iSCSI setup. The open source iSCSI target software from IET [16] and the initiator software from open-iscsi.org within the driver domain was used for all the VMs. One of the five machines executed up to twenty concurrent 100 MB VMs, each hosting a 400 MB Quicksort application. The number of concurrent guest VMs was varied from 1 to 20, and in each guest Quicksort was run to completion. The same experiment was performed for both MemX-DD and iSCSI. FIG. 9 shows that, at about 10 GB of collective memory and 20 concurrent VMs, the execution time with MemX-DD is about 5 times smaller than with iSCSI setup. Thus even with concurrent VMs, MemX-DD provides a clear performance edge.

E. Live VM Migration

MemX-VM configuration has a significant benefit when it comes to migrating live VMs [11] to better utilize resources. Specifically, a VM using MemX-VM can be seamlessly migrated from one physical machine to another, without disrupting the execution of any large memory applications within the VM. First, since MemX-VM is designed as a self-contained pluggable module within the guest OS, any age-to-server mapping information is migrated along with the kernel state of the guest OS without leaving any residual dependencies behind in the original machine. Second reason is that RMAP used for communicating read-write requests to remote memory is designed to be reliable. As the VM caries with itself its link layer MAC address identification during the migration process, any in-flight packets dropped during migration are safely retransmitted to the VM's new location. An experiment was conducted to compare the live VM migration performance using iSCSI versus MemX-VM. For the iSCSI experiment, a single iSCSI disk was configured as swap space. Similarly, for the MemX-VM case, the block device exported by client module was configured as the swap device. In both configurations, a 1 GB Quicksort was run within a 512 MB guest. The live migration took an average of 26 seconds to complete in the iSCSI setup whereas it took 23 seconds with MemX-VM. While further evaluation is necessary, this experiment points to potential benefits for live VM migration when using MemX.

F. Local De-Duplication

The local de-duplication mechanism was evaluated. In other words the amount of memory saved by eliminating the storage of duplicate memory pages was measured. The MemX-VM mode was used with 1 GB memory and two VCPUs per client VM. 15 servers configured as described above were used, providing 1.25 TB of memory collectively.

Figure 10:
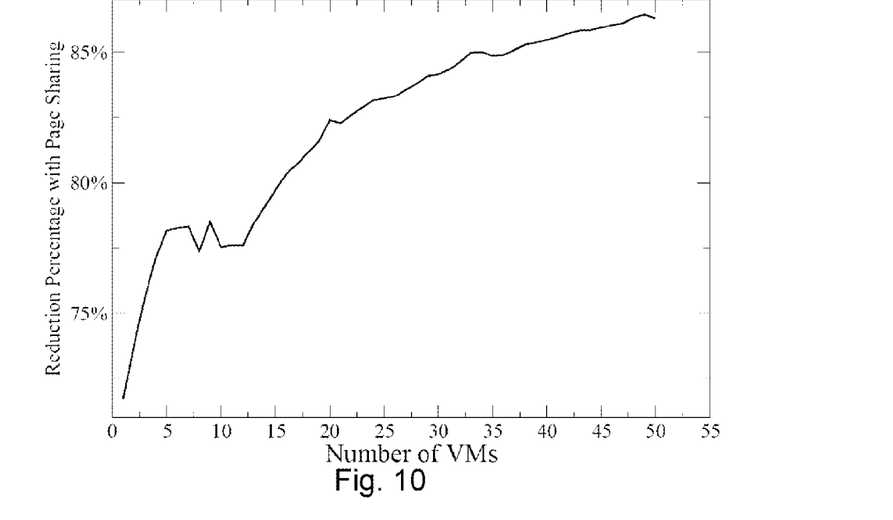
FIG. 10 shows a graph of memory usage reduction with local de-duplication.

For the VM creation experiment, an ext3 file system was built on the block device exported by the MemX client module, copied an 8.7 GB VM image and corresponding config file to it, and then booted up the VM. Up to 50 such VMs were created in the experiments. Similarly, for TPCH benchmark, 20 VMs populated their respective ext3 block devices with 20 GB dataset each generated by the TPC-H benchmark. For sparse matrix application, the block device was configured as a swap space. The size of the matrix was 4.8 GB with dimensions 20000×20000 and 30% zeros. For the VM creation workload, Table II shows that local de-duplication achieves an 85% reduction in memory usage. Furthermore, the reduction percentage increases with the number of client VMs. The VM creation experiment was run on a range of MemX client VMs from 1 to 50. FIG. 10 demonstrates a steadily increasing level of memory savings. With one client VM, the reduction in memory usage is 71.73% whereas with 50 client VMs, the reduction reaches 86.29%. TPC-H and Sparse matrix workloads yield lower, yet significant, memory savings. Once implemented, global de-duplication is expected to yield even higher savings.

G. Comparison with Local Ramdisk

Table III compares the performance of MemX with local Ramdisk to understand the overhead due to network communication. A custom I/O microbenchmark was used inside a VM having memory of size 8 GB and 2 VCPUs. For each experiment, a file of size 4 GB was read from or written to the block device, with 4 KB I/O buffer size. The table shows that Ramdisk provides 5× faster writes and 7× faster reads than MemX over a 1 Gbps LAN. Faster 10 GigE and Infiniband networks can reduce this performance gap.

TABLE 2

MEMORY USAGE WITH AND WITHOUT DEDUPLICATION

| Application | W/Sharing (GB) | W/O Sharing (GB) | Reduction |
|---|---|---|---|
| VM Creation | 59.65 | 435 | 86.29 |
| TPC-H | 168 | 443 | 62.1 |
| Sparse Matrix | 36.39 | 48.44 | 24.88 |

TABLE 3

I/O PERFORMANCE OF MEMX VERSUS LOCAL RAMDISK (MB/s)

| | Seq. Write | Rand. Read | Seq. Read | Rand Read |
|---|---|---|---|---|
| Ramdisk | 337.45 | 280.29 | 550.27 | 305.37 |
| MemX-VM | 88.13 | 58.07 | 110.06 | 43.03 |
| MemX-DD | 97.63 | 60.77 | 110.07 | 48.42 |

The MemX system virtualizes cluster-wide memory for data-intensive and large memory VM workloads. Large dataset applications using MemX do not require any specialized APIs, libraries, or any additional modifications. MemX can operate as a kernel module within an individual VM (MemX-VM), or in a shared driver domain (MemX-DD), or within the hypervisor (MemX-VMM) providing different tradeoffs between performance and functionality. Detailed evaluations of MemX using a number of benchmarks over 1 Gbps Ethernet show that I/O latencies are reduced by an order of magnitude and that large memory applications speed up significantly when compared to virtualized and iSCSI disk. This performance will scale for lower-latency higher-bandwidth interconnects, such as 10 GigE and Infiniband. MemX can provide almost-constant low-latency access to massive datasets.

H. Hardware Overview

Figure 11:
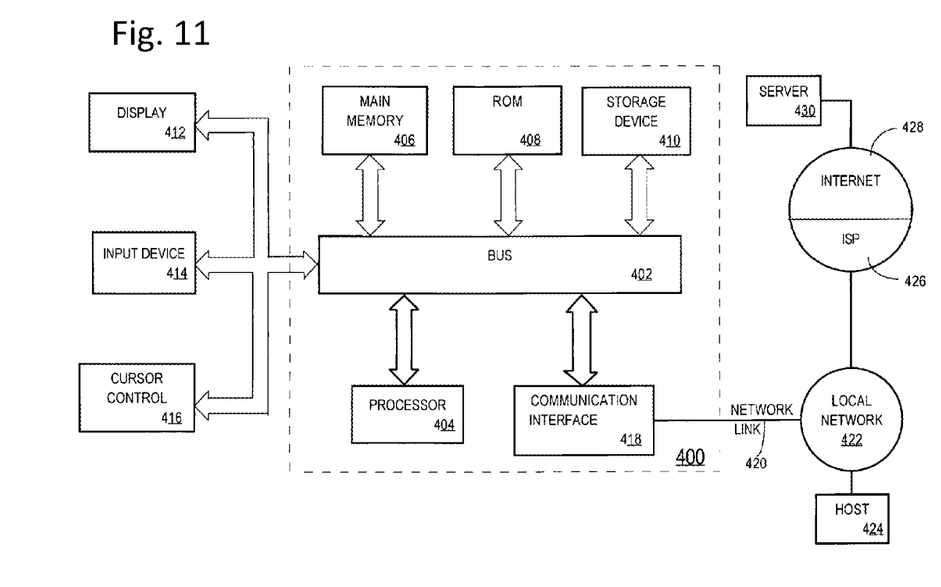
FIG. 11 shows a block diagram of a representative prior art networked computer system.

FIG. 11 (see U.S. Pat. No. 7,702,660, issued to Chan, expressly incorporated herein by reference), shows a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In this description, several preferred embodiments were discussed. Persons skilled in the art will, undoubtedly, have other ideas as to how the systems and methods described herein may be used. It is understood that this broad invention is not limited to the embodiments discussed herein. Rather, the invention is limited only by the following claims.

REFERENCES

Each of the Following is Expressly Incorporated Herein by Reference

[1] J. S. \Titter, "External memory algorithms and data structures: dealing with massive data," *ACM Comput. Surv., vol.* 33, no. 2, pp. 209-271, 2001.

[2] Scaling memcached at Facebook, <http>://www.facebook.com/note.php! note id-39391378919.

[3] G. DeCandia, D. Hastorun, M. Jampani, G. Kakulapati, A. Lakshman, A. Pilchin, S. Sivasubramanian, P. Vosshall, and W. Vogels, "Dynamo: Amazon's highly available key-value store," *SIGOPS Oper. Syst. Rev.,* 41(6), 2007.

[4] Cray Inc., "Cray XT4 and XT3 Datasheet http://www.cray.com/downloads/cray xt4 datasheet.pdf"

[5] H Garcia-Molina and K. Salem, "Main memory database systems: An overview," *IEEE Trans. on Knowl. and Data Eng.*, vol. 4, no. 6, pp. 509-516, 1992.

[6] D. DeWitt, R. Katz, F. Olken, L. D. Shapiro, M. R. Stonebraker, and D. Wood, "Implementation techniques for main memory database systems," in *Proc. of ACM SIGMOD International Conference on Management of Data*, 1984.

[7] Memcached, <http>://memcached.org

[8] F. Cuenca-Acuna and T. Nguyen, "Cooperative caching middleware for cluster-based servers," in *Proc. of High Performance Distributed Computing*, August 2001.

[9] J. Gray and F. Putzolu, "The 5 minute rule for trading memory for disc accesses and the 10 byte rule for trading memory for CPU time," *SIGMOD Rec.*, 16(3), pp. 395-398, 1987.

[10] P. Barham, B. Dragovic, K. Fraser, S. Hand, T. Harris, A. Ho, R. Neugebauer, I. Pratt, and A. Warfield, "Xen and the art of virtualization," in *Proc. of ACM Symposium on Operating Systems Principles*, Bolton, N.Y., USA, 2003, pp. 164-177.

[11] C. Clark, K. Fraser, S. Hand, J. Hansen, E. Jul, C. Limpach, I. Pratt, and A. Warfield, "Live migration of virtual machines," in *Proc. of Network Systems Design and Impl.*, 2005.

[12] "Bonnie++,"<http>://www.coker.com.au bonnie

[13] Sysbench, <http>:sysbench.sourceforge.net/index.html.

[14] POV-Ray, <http>://povray.org/.

[15] TPC-H Benchmark, <http>://www.tpc.org/tpch/.

[16] iSCSI, <http>://iscsitarget.sourceforge.net/.

[17] S. Dwarkadas, N. Hardavellas, L. Kontothanassis, R. Nikhil, and R. Stets, "Cashmere-VLM: Remote memory paging for software distributed shared memory," in *Proc. of Intl. Parallel Processing Symposium*, 1999.

[18] C. Amza, A. Cox, S. Dwarkadas, P. Keleher, H. Lu, R. Rajamony, W. Yu, and W. Zwaenepoel, "Treadmarks: Shared memory computing on networks of workstations," *IEEE Computer*, vol. 29, no. 2, pp. 18-28, February 1996.

[19] D. Comer and J. Griffoen, "A new design for distributed systems: the remote memory model," *In Proc. of the USENIX* 1991 *Summer Technical Conference*, pp. 127-135, 1991.

[20] M. Feeley, W. Morgan, F. Pighin, A. Karlin, and H. Levy, "Implementing global memory management in a workstation cluster," *Oper. Syst. Rev.*, 29(5), pp. 201-212, 1995.

[21] T. Anderson, D. Culler, and D. Patterson, "A case for NOW (Network of Workstations)," *IEEE Micro,* 15(1), 1995.

[22] E. Markatos and G. Dramitinos, "Implementation of a reliable remote memory pager," in *USENIX Annual Technical Conference,* 1996.

[23] M. Flouris and E. Markatos, "The network RamDisk: Using remote memory on heterogeneous NOWs," *Cluster Computing,* vol. 2, no. 4, 1999.

[24] S. Liang, R. Noronha, and D. K. Panda, "Swapping to remote memory over infiniband" in *Cluster Computing,* September 2005.

[25] J. (justerhout, P. Agrawal et. al., "The case for ram-clouds: scalable high-performance storage entirely in dram," *SIGOPS Oper. Syst. Rev.,* vol. 43, no. 4, pp. 92-105, 2009.

[26] D. Milojicic, F. Douglis, Y. Paindaveine, R. Wheeler, and S. Zhou, "Process migration survey," *ACM Comp. Surv.,* vol. 32(3), pp. 241-299, 2000.

[27] C. Waldspurger, "Memory resource management in VMware ESX server," in *Oper. Systems Design and Impl.,* 2002.

[28] D. Gupta, S. Lee, M. Vrable, S. Savage, A. Snoeren, G. Varghese, G. Voelker, and A. Vandat, "Difference engine: Harnessing memory redundancy in virtual machines," in *Proc. of Oper. Systems Design and Impl.,* 2008.

[29] T. Wood, G. Tarasuk-Levin, P. Shenoy, P. Desnoyers, E. Cecchet, and M. Corner, "Memory buddies: exploiting page sharing for smart colocation in virtualized data centers," in *Proc. of VEE,* 2009.

[30] E. Lee and C. Thekkath, "Petal: distributed virtual disks," in *Proc. of Intl. Conf. on Architectural support for programming languages and operating systems,* pp. 84-92, 1996.

What is claimed is:

1. A distributed virtual memory system, comprising:
a block device interface, providing an interface between a first memory system of a client and a virtual distributed memory system having a linear I/O space;
a module configured to map the linear I/O space of the block device interface to a second memory system of at least one remote server, wherein memory pages are defined for communication through a network interface between the client and the at least one remote server, wherein a plurality of pages comprise a page group, and the module is further configured to inferentially determine a storage location of a memory page based on a logical position of the memory page within the page group and an algorithm; and
a write buffer configured to service write requests.

2. The system according to claim 1, further comprising a hash table configured to determine duplicated memory pages.

3. The system according to claim 2, wherein a duplicated memory page is represented by an alias.

4. The system according to claim 1, further comprising a parity generator, wherein a set comprising a plurality of memory pages are processed to generate at least one parity page.

5. The system according to claim 4, wherein the module is configured to store the plurality of memory pages and the at least one parity page on different remote servers.

6. The system according to claim 1, wherein a memory page comprises metadata, the metadata representing an aliased memory page resulting from deduplication.

7. The system according to claim 4, further comprising a fault recovery module configured to generate a memory page of a respective set based on other memory pages and at least one parity page of the set.

8. The system according to claim 1, wherein the module is configured to store a memory page on a remote server, evict the memory page from a client, retrieve the memory page from the remote server, and restore the memory page on the client.

9. The system according to claim 8, wherein the client comprises a virtual machine, and the module comprises a logical process within the virtual machine.

10. The system according to claim 8, wherein the client comprises a virtual machine, and the module comprises a logical process outside the virtual machine.

11. The system according to claim 10, wherein the module implements memory page deduplication for a plurality of virtual machines concurrently.

12. The system according to claim 1, wherein the at least one remote server comprises:
a resource discovery transmission module, configured to periodically transmit resource announcement messages through a computer network, indicating available server resources and load;
a serving module, configured to generate a communication to the module, comprising a server response to a task to which is appended the indicated available server resources and load; and
a migration module, configured to migrate tasks consuming the server resources to another server module across the computer network, and to communicate an update identifying the other server module to which the tasks are migrated.

13. The server system according to claim 12, wherein the client asks comprise memory page storage and retrieval.

14. The server system according to claim 13, wherein the serving module is configured to provide data deduplication and representation of duplicated data with an index identifying a storage location of the data.

15. The server system according to claim 14, wherein the serving module is further configured to regenerate duplicated data when either the duplicated data is requested or the data is modified.

16. The server system according to claim 12, wherein the serving module predicts a task.

17. The server system according to claim 16, wherein the task comprises a memory access, and wherein the server module is configured to proactively retrieve a predicted required memory page.

18. The server system according to claim 12, further comprising a distributed process coordination module, configured to communicate with other server systems and coordinate server responses to correlated tasks.

19. The server system according to claim 12, wherein the tasks comprise virtual memory storage and retrieval operations emulating a block device interface.

20. The server system according to claim 19, wherein the tasks are generated within a virtual machine environment.

21. The server system according to claim 19, wherein the tasks are generated partially within and partially outside a virtual machine environment.

22. The server system according to claim 12, wherein the server system is configured to process tasks for a plurality of clients.

23. The server system according to claim 22, wherein the tasks comprise memory storage and retrieval operations, further comprising a parity module, and a deduplication module, wherein the server system is configured to determine whether a memory page stored on the server system is duplicated, to generate an alias of a duplicated page, to store as metadata in a retained copy of the duplicated memory page an index of a duplicated page which is not retained, and to update parity information for the retained copy of the duplicated memory page.

24. The server system according to claim 23, wherein the parity information is stored on at least one other server system, and wherein the server system is further configured to retrieve a copy of other memory pages which are represented in joint parity information, to compute new parity information, and to store the new parity information in place of the prior parity information.

25. The server system according to claim 12, wherein the migration module is configured to instantiate a new virtual machine, and then to transfer responsibility for tasks to the new virtual machine, wherein the server system and the new virtual machine concurrently handle respective tasks during a period in which less than all of the client tasks are migrated.

26. A virtual memory system comprising:
- a plurality of virtual machines configured to execute on common physical hardware having a memory;
- a common device driver domain, shared by the plurality of virtual machines;
- a hypervisor, coordinating the execution of the plurality of virtual machines and the common device driver domain;
- a network interface; and
- a virtual memory module, configured to at least one of:
  - execute within a respective virtual machine and provide an interface to the common device driver configured as a large virtual memory for the respective virtual machine, supporting communication through the network interface controlled by the common device driver domain;
  - execute within the common driver domain and service the plurality of virtual machines, providing a block memory device interface for each respective virtual machine; and
  - execute within the hypervisor, and provide a virtual memory interface for the hypervisor, which is reported to the plurality of virtual machines as a large available memory pool, wherein the virtual memory module stores and retrieves information as memory pages wherein a plurality of memory pages together comprise a page group, and inferentially determines a storage location of a respective memory page of the page group selectively based on a logical position of the memory page within the page group and an algorithm.

27. A server module for a distributed virtual memory system, comprising:
- a resource discovery transmission module, configured to periodically send resource announcement messages through a computer network, providing an indication of available local memory to the server module and load;
- a page serving module, configured to retrieve a page from local memory, append to the page an indication of available local memory to the server module and load, and transfer the appended page through the computer network;
- a page migration module, configured to migrate a page of memory to another server module across the computer network, and to send a message to a respective client to provide an update of a location of the migrated page; and
- wherein a plurality pages comprise a page group, and the page migration module inferentially determines a storage location of a respective page selectively based on a logical position of the respective page within the page group and an algorithm.

* * * * *